A. Hathaway.
Perforating Paper.
Nº 79,345. Patented Jun. 30, 1868.
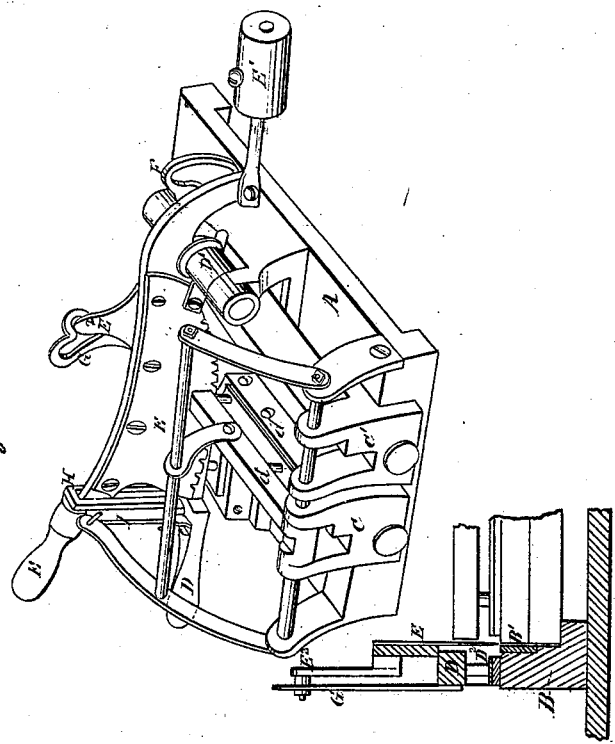
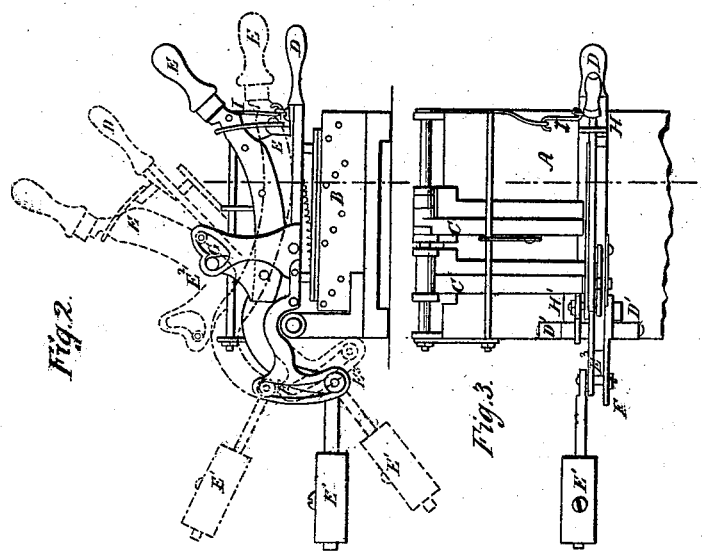
Witnesses.
Chas F. Clausen.
L. Murphy.
Inventor.
Alford Hathaway

United States Patent Office.

ALFRED HATHAWAY, OF CHARLESTOWN, MASSACHUSETTS.

*Letters Patent No. 79,345, dated June 30, 1868.*

IMPROVEMENT IN PAPER-SHEARS.

*The Schedule referred to in these Letters Patent and making part of the same.*

TO ALL WHOM IT MAY CONCERN:

Be it known that I, ALFRED HATHAWAY, of Charlestown, in the county of Middlesex, and State of Massachusetts, have invented a new and useful Improvement in Machines for Perforating Paper; and I do hereby declare that the following is a full, clear, and exact description of the same, reference being had to the annexed drawings, making part of this specification, in which—

Figure 1 is a perspective view,

Figure 2 is a vertical section,

Figure 3 is a plan, and

Figure 4 is a vertical transverse section of the shears.

The same letters, in all the figures, indicate parts which are identical.

The object of this invention is to prepare sheets of blank checks, &c., for being torn on straight lines between the checks, by perforating the margin of the checks, &c., with a series of holes, leaving enough of the paper to keep the checks, &c., in place until it is desired to separate or use them.

In the annexed drawings, I have represented a machine for perforating checks or blank notes, &c., across the sheet, with all the parts complete, and I have also shown how similar knives may be used for perforating, at the same time, the lines between the checks, as the several parts would be merely duplicates of one another. I have not shown this part of the machine as complete, having omitted the cutting-apparatus.

A is the table, on which the machine is attached. B is a block, passing across the table, for supporting the sheets to be cut, and C and C' are similar adjustable blocks, for a like purpose. The line between the check or other blank and the butts is cut on the block B, and the longitudinal lines between the checks upon the blocks C and C', the latter blocks being made adjustable, sliding on ways, so that they may be adjusted according to the width of the blanks. When properly disposed, they are to be secured by set-screws, or by other equivalent means. The sheets to be perforated are placed upon the blocks B, C, and C', and then firmly secured by bringing down the levers D $d$ $d$, which, bearing upon the sheets, hold them in place. The lower faces, $D^2$, of these levers are covered with India rubber. The levers D turn upon an axis, $D^1$, forming the fulcrum of the lever.

The sheets being thus secured, they are perforated by the action of the shears B and B'. The latter is a sharp edge, attached to the inner face of the block, and either straight, or divided into teeth. The former is a blade, the edge of which is denticulated and sharpened. It is also rounded on the edge, from end to end, of the blade. This blade has a vertical oscillation in a plane, to which it is confined by the guides H and H', placed at each end of the blade. The end of the oscillating-arm, to which the blade is attached, projects beyond the fulcrum D, and has an adjustable counterpoise, E', attached, to balance the weight of the blade.

The vertical action of the knife is controlled by the slot F, in the end of an arm attached to the lever D, and by another slot, G, in a standard, also attached to said lever D. The former slot is in an arc of a circle; the latter is cordiform; and the blade is connected with each of them by wrists, on which are friction-collars. The former slot permits the blade to have a rocking motion on its edge, and moves it forward, to give it a shearing action on the sheets; and the latter maintains a pressure, by the blade upon the sheets to be perforated, throughout the entire motion of the blade, both in descending and in ascending, as the knife is rocked towards the handle.

By connecting the series of levers D $d$ $d$, and also the series of knives, by means of rods I, the whole series may be made to operate simultaneously by one action, thus perforating as many lines as may be necessary on the sheet at the same time.

The slots F and G form self-adjusting fulcra, by which the sheets are saved from being bent or distorted by the action of the knife.

What I claim as my invention, and desire to secure by Letters Patent, is—

1. The mechanism for securing the cutting-action of the blade E, by means of wrist-pins, acting in slots F and G, shaped as set forth, and located in arms attached to the lever D, substantially as described.

2. Shear-blades, when one or both are denticulated upon the edge, and they are united by self-adjusting fulcra, substantially in the manner and for the purpose set forth.

3. The combination of the stationary block B and lever D with adjustable blocks C C′ and levers $d\ d$, the latter being so connected with the lever D, by intermediate levers and rods, that they may be operated simultaneously with the latter by a single movement, substantially as and for the purpose set forth.

4. The combination of the lever D and denticulated shearing-blade E, substantially as and for the purpose set forth.

In testimony whereof, I have signed my name to this specification in the presence of two subscribing witnesses.

ALFRED HATHAWAY.

Witnesses:
WILLIAM ROGERS,
FRED. H. APPLITON.